United States Patent [19]

Kline

[11] 4,216,116
[45] Aug. 5, 1980

[54] PHENOLIC/ESTER ANTIOXIDANT SYSTEM

[75] Inventor: Richard H. Kline, Cuyahoga Falls, Ohio

[73] Assignee: The Goodyear Tire & Rubber Company, Akron, Ohio

[21] Appl. No.: 843,772

[22] Filed: Oct. 20, 1977

[51] Int. Cl.$^2$ ............................................. C09K 15/08
[52] U.S. Cl. ................................... 252/404; 252/406; 260/45.95 R
[58] Field of Search ............................. 252/404, 406; 260/45.95 R, 45.75

[56] References Cited

U.S. PATENT DOCUMENTS

| | | | |
|---|---|---|---|
| 3,398,116 | 8/1968 | Giolito | 252/406 |
| 3,523,083 | 8/1970 | Prerri et al. | 252/406 |
| 3,590,056 | 6/1971 | Tholstrup | 252/406 |
| 3,652,495 | 3/1972 | Dean | 252/404 |
| 3,816,542 | 6/1974 | Zaweski | 252/404 |
| 3,886,114 | 5/1975 | Beadle | 252/404 |
| 3,962,124 | 6/1976 | Motz | 252/404 |
| 4,066,562 | 1/1978 | Wollensak et al. | 252/404 |
| 4,070,304 | 1/1978 | Hinzie | 252/404 |

Primary Examiner—Benjamin R. Padgett
Assistant Examiner—J. L. Barr
Attorney, Agent, or Firm—J. Y. Clowney

[57] ABSTRACT

A combination of a phenolic antioxidant, such as the butylated reaction product of p-cresol and dicyclopentadiene and an ester such as 3,6,9-trioxaundecamethylene bis [3-(dodecylthio)propionate] is used to stabilize polymers against oxidative degradation.

3 Claims, No Drawings

PHENOLIC/ESTER ANTIOXIDANT SYSTEM

This invention relates to a stabilization system for organic materials subject to oxidative, degradation. More particularly it relates to a two component stabilizer system for polymers.

Stabilizer systems for polymers and other materials subject to oxidative degradation are well known in the art. Phenolic stabilizer systems are commonly used where nondiscoloration is desired. Combinations of phenolic antioxidants and synergists have been used to either increase the effectiveness of antioxidants or to permit the use of lower amounts of antioxidants while maintaining the same level of antioxidant effectiveness. In this respect see, for example, U.S. Pat. Nos. 3,652,495; 3,629,149 and 3,758,549. A continuing need exists for additional phenolic antioxidant systems.

It is an object of the present invention to provide a stabilizer system for polymers and other materials subject to oxidative degradation. It is another object to provide a method for improving the activity of phenolic antioxidants. Other objects will become apparent as the description proceeds.

The objects of the present invention are accomplished by combining a phenolic antioxidant with an ester having the following structural formula:

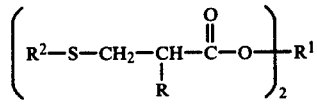
(I)

wherein R is selected from the group consisting of hydrogen and methyl, wherein $R^1$ is a polyalkylene glycol ether radical having the following structure:

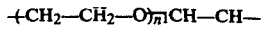

wherein $n^1$ is an integer from 1 to 7 and wherein $R^2$ is selected from the group consisting of alkyl radicals having 1 to 24 carbon atoms, (preferably primary alkyl), aryl radicals having 6 to 12 carbon atoms and aralkyl radicals having 7 to 12 carbon atoms.

The terminology "polyethyleneoxydiester of a thiopropionic acid" as used herein and in the claims shall refer to the compounds of structural formula I.

Neither the phenolics or esters used in the practice of the present invention are limited to any method of preparation.

The following list of compounds illustrate, but are not intended to limit, ester which can be used in the practice of the present invention.
3,6,9-trioxaundecamethylene bis (3-n-dodecylthiopropionate)
3,6-dioxaoctamethylene bis (3-n-dodecylthio-2-methylpropionate)
3,6,9-trioxaundecamethylene bis (3-n-dodecylthio-2-methylpropionate)
3-oxapentamethylene bis (3-n-dodecylthiopropionate)
3,6,9-trioxaundecamethylene bis (3-phenylthiopropionate)
3,6,9-trioxaundecamethylene bis (3-benzylthio-2-methylpropionate)
3-oxapentamethylene bis (3-benzylthio-2-methylpropionate)

The esters of the present invention may also be conveniently prepared by reacting a suitable acid such as 3-(dodecylthio)propionic acid with a polyether glycol in a known simple acid catalyzed esterification procedure as described in U.S. Pat. No. 2,601,063.

An alternate preparation of the esters involves the initial reaction of a suitable thiol such as dodecane thiol with a lower alkyl ester of acrylic or methacrylic acid such as ethyl acrylate or methyl methacrylate. The alkylthiopropionate ester is then transesterified with a polyether glycol such as 3,6,9-trioxaundecane-1,11-diol.

The esters of the present invention can be prepared by reacting a suitable thiol such as dodecane thiol with an ester of acrylic or methacrylic acid such as 3,6,9-trioxaundecamethylene diacrylate or dimethacrylate in the presence of a basic catalyst such as KOH or benzyl trimethyl ammonium hydroxide.

Any phenolic antioxidant will benefit by the presence of the above identified ester. For example, the presence of an ester of this invention brings about a substantial increase in the effectiveness of trialkylated phenolic antioxidants as represented by the following structural formula:

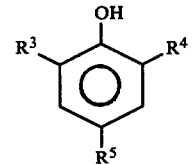

wherein $R^3$ and $R^4$ are selected from the group consisting of tertiaryalkyl radicals having 4 to 8 carbon atoms, cycloalkyl radicals having 5 to 12 carbon atoms and aralkyl radicals having from 7 to 12 carbon atoms and wherein $R^5$ is selected from the group consisting of alkyl radicals having 1 to 20 carbon atoms, cycloalkyl radicals having 5 to 12 carbon atoms and aralkyl radicals having 7 to 12 carbon atoms.

The following illustrate compounds conforming to the above structural formula.
2,6-ditert.butyl-4-methyl phenol
2-tert.octyl-4,6-ditert.butyl phenol
2,4,6-tris-(α-methylbenzyl)phenol
2,4-bis(α,α-dimethylbenzyl)-6-tert.butylphenol Alkylated reaction products of simple phenols and dicyclopentadiene such as those described in U.S. Pat. No. 3,305,522 also benefited substantially. The contents of said patent are incorporated herein by reference.

Phenolic antioxidants are extremely well known in the art and are described and illustrated in columns 2 to 6 of U.S. Pat. No. 3,756,549 and columns 2 and 3 of U.S. Pat. No. 3,080,338, both of which are incorporated herein by reference.

The total amount of stabilizer system, that is, the stabilizing amount, can also vary depending on the type of polymer being stabilized as is the case for most antioxidant systems. For example, with saturated polymers such as polypropylene, amounts as low as 0.01 part can be used. With diene polymers such as butadiene/styrene copolymers larger amounts are normally required, for example 0.1 to 10 parts.

The above amounts are merely guidelines and not intended to be limitations of the scope of the present invention since the amounts necessary can depend upon the type of polymer being stabilized, the oxidative conditions to which it is exposed, etc.

Any unvulcanized polymer subject to oxidative degradation can benefit from the presence of the stabilizer system of the present invention. Such polymers include, but are not limited to, natural rubber, homopolymers of diolefins such as 1,3-butadiene and 2,3-dimethyl-butadiene-1,3, as well as copolymers of such dienes with monoolefins such as styrene and acrylonitrile. Polyolefins, i.e., homopolymers and copolymers of monoolefins also benefit, e.g., polypropylene, polyethylene and ethylene/propylene copolymers.

The improvement offered by the ester is not observed with sulfur vulcanized polymers. Polymers such as terpolymers of butadiene/styrene/methacrylic acid, however, will benefit by the use of the ester with the phenolic antioxidant when vulcanized with materials such as zinc oxide.

The method of addition of the stabilizer system to the polymers is not critical. The addition may be accomplished by such conventional means as banburying or milling with solid polymers or addition to the latex form of polymers.

The stabilizer system will benefit polymers in the presence of conventional compounding ingredients such as sulfur, zinc oxide, carbon black, etc., as well as in their absence.

The order of addition of the phenolic antioxidant and the ester is not critical. The compounds may be added separately or in combination.

The following examples include illustrations of the present invention but are not intended to limit the invention.

EXAMPLE 1

A neat solution of 30.2 grams (0.10 mol) of 3,6,9-trioxaundecamethylene diacrylate and 40.4 grams (0.20 mol) of n-dodecane thiol was prepared in a 500 milliliter conical flask. To this solution was added 0.005 gram of KOH. The solution was slowly heated to 80° C. The KOH dissolved and an exotherm resulted. The exotherm peaked at 130° C. The temperature was then maintained at 100° C. for one hour. The reaction product was bottled as is without further work-up. Yield 70.6 grams, 100 percent. On cooling the reaction product solidified to a waxlike solid. The product was 3,6,9-trioxaundecamethylene bis(3-n-dodecylpropionate).

EXAMPLE 2

The compound 3,6,9-trioxaundecamethylene bis [3-dodecylthio)propionate], was added to SBR-1006 at a concentration of 0.5 phr, both by itself and in combination with 0.5 phr of a commercial antioxidant. The samples were submitted to the oxygen absorption test at 100° C. The commercial antioxidant was a butylated, octylated phenol.

The propionate protected sample reached 1 percent oxygen absorbed in 35 hours. The phenolic protected sample (0.5 part) reached 1 percent oxygen in 227 hours. The sample protected by the combination did not reach 1 percent oxygen until 573 hours.

EXAMPLE 3

Two different commercial phenolic antioxidants and the propionate of Example 2 were evaluated individually in carboxylated SBR (terpolymer of butadiene/styrene/methacrylic acid). The propionate was also evaluated in combination with each of the phenolic antioxidants. All samples were heat aged to failure at 275° F. Commercial antioxidant A (butylated reaction product of p-cresol and dicyclopentadiene) was tested at the 0.20, 0.30, 0.40 and 0.50 part per 100 parts by weight of carboxylated SBR level. The samples failed after 288, 312, 336 and 360 hours respectively. Commercial antioxidant B (blend of phenolics including commercial antioxidant A) failed in 262 hours at the 0.50 part level. The propionate stabilized sample failed after 215 hours at the 0.50 part level.

The polymer stabilized with the combinations performed as follows:

| | Sample (Parts by Weight) | | | | | | |
|---|---|---|---|---|---|---|---|
| | 1 | 2 | 3 | 4 | 5 | 6 | 7 |
| Commercial Antioxidant A | 0.20 | 0.10 | — | — | 0.50 | — | — |
| Commercial Antioxidant B | — | 0 | 0.20 | 0.10 | — | 0.50 | — |
| Propionate of Example 2 | 0.30 | 0.40 | 0.30 | 0.40 | — | — | 0.50 |
| Hours to Failure at 275° F. | 460 | 460 | 384 | 408 | 360 | 262 | 215 |

As demonstrated by the above results protection was obtained with the combinations that was superior to the individual components alone.

EXAMPLE 4

Polypropylene was stabilized with combinations of the commercial antioxidant A and the propionate and oven aged to failure at 140° C. The results are listed below.

| | Sample | | | | | |
|---|---|---|---|---|---|---|
| | 4 | 5 | 6 | 7 | 8 | 9 |
| Commercial Antioxidant A | 0.20 | — | 0.16 | 0.12 | 0.08 | 0.04 |
| Propionate of Example 2 | — | 0.20 | 0.04 | 0.08 | 0.12 | 0.16 |
| Days to Failure at 140° C. | 11 | 2 | 11 | 35 | 46 | 53 |

As evidenced by the polypropylene data, the amount of protection can vary according to the ratio of ester to phenol. The particular ratio for maximum protection may vary depending upon the polymer being stabilized, the phenolic antioxidant and ester being used, the total level of stabilizer system, etc. Once the polymer, phenolic antioxidant and ester have been selected routine variation of the phenolic/ester ratio will indicate what ratios offer improvements and at what ratio maximum protection is obtained.

Routine weight ratios to be checked could be from 5/95 ester/phenolic antioxidant to 95/5 ester/phenolic antioxidant. A ratio of 30/70 to 95/5 ester/phenol would appear to be preferred. However, none of the foregoing is intended to be construed as a limitation as to the ester/phenol ratio.

While certain representative embodiments and details have been shown for the purpose of illustrating the invention it will be apparent to those skilled in this art that various changes and modifications may be made therein without departing from the spirit or scope of the invention.

What I claim is:

1. An antioxidant combination comprised of (A) a phenolic antioxidant and (B) a polyethyleneoxydiester of a thiopropionic acid of the formula

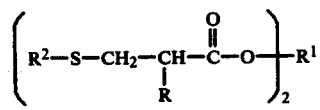

wherein R is hydrogen or a methyl group, wherein $R^1$ is a polyalkylene glycol ether radical having the structure

wherein $n^1$ is 1 through 7, wherein $R^2$ is selected from the group of alkyl radicals containing 1 through 24 carbon atoms, aryl radicals containing 6 through 12 carbon atoms and aralkyl radicals containing from 7 through 12 carbon atoms.

2. An unvulcanized polymer containing a stabilizing amount of the antioxidant combination of claim 1.

3. The antioxidant combination of claim 1 wherein the diester is 3,6,9-trioxaundecamethylene bis (3-n-dodecylthio)propionate).

* * * * *